Patented Feb. 20, 1940

2,190,817

UNITED STATES PATENT OFFICE 2,190,817

METHOD OF DETERMINING THE UTILITY OF CARBONS FOR DEPOLARIZING ELECTRODES

Werner Wisfeld, Frankfort-on-the-Main, Germany, assignor to Carbo-Norit-Union Verwaltungs-Gesellschaft m. b. H., Frankfort-on-the-Main, Germany, a corporation of Germany Application December 4, 1936, Serial No. 114,258

2 Claims. (Cl. 136—121)

This invention relates to a positive electrode for galvanic cells.

Active carbon has recently been largely used as effective depolarising composition for the production of positive electrodes for galvanic cells, such electrodes being constituted entirely, or only partially, of such carbon. Practical experience with galvanic cells in which active carbon has been employed as depolariser, has now shown that the behaviour of active carbons employed for this purpose varies considerably. Thus, carbons of equal capacity in respect of adsorption—which is a factor usually accepted as a criterion of their value—do not display any concordance in behaviour as depolarisers.

It has been established in accordance with the present invention that the suitability of active carbons for depolarising increases with their power of decomposing a solution of hydrogen peroxide. It has been ascertained that active carbons are extremely suitable as depolarisers if they are so constituted that 0.2 grm. of the pulverised carbon, suspended in 10 cc. of distilled water in a heat-insulated vessel, and treated with 25 cc. of a 3% solution of hydrogen peroxide, cause the temperature (initially 20° C.) of the mixture to rise by at least 1° C. within 3 minutes, or effect the liberation of at least 25 cc. of oxygen (measured at 0° C. and 760 mm. Hg). This test does not involve either oxidation or reduction. It is a decomposition of hydrogen peroxide by the catalytic action of the carbon according to the equation $2H_2O_2 = 2H_2O + O_2$. This reaction is definitely exothermic as is generally true of the decomposition of peroxides, and liberates a substantial quantity of heat.

The oxygen is not absorbed by the carbon and then driven off, but is liberated directly into the atmosphere.

Figure 1:
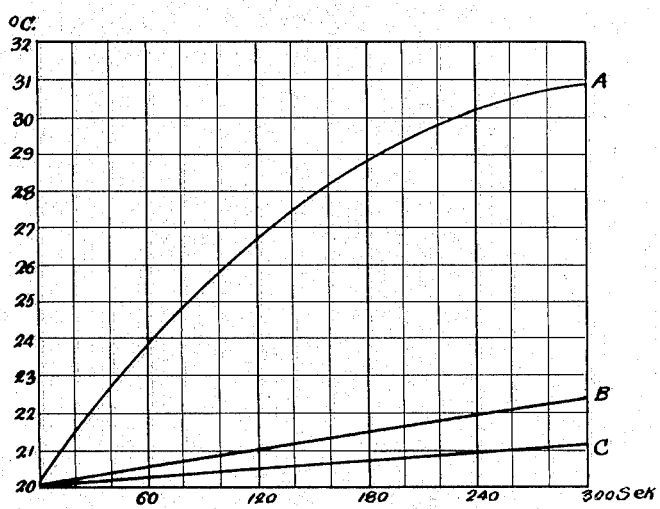
Figure 2:
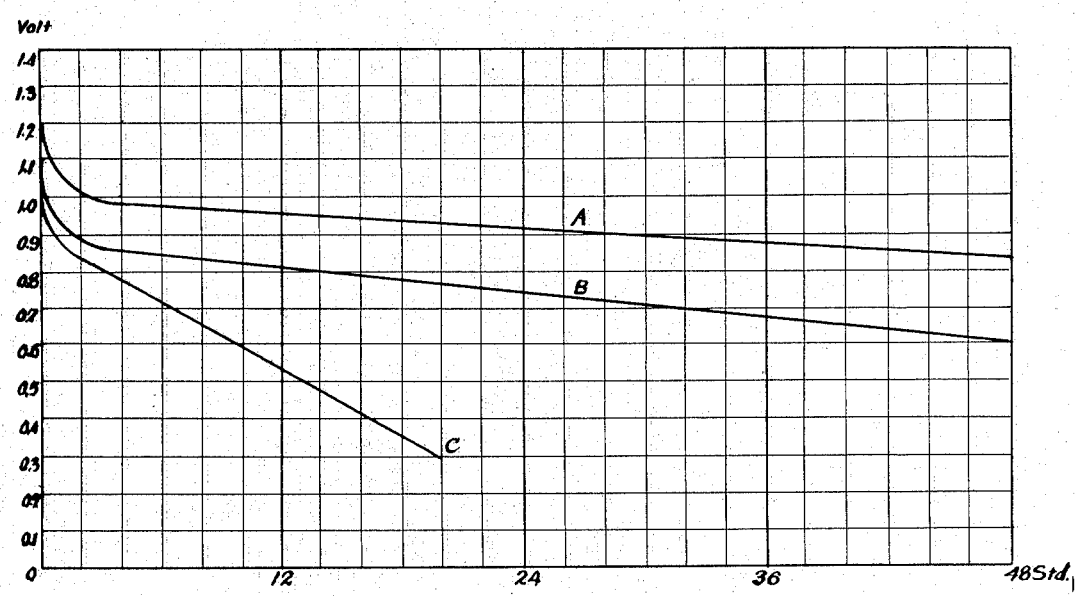

In order more clearly to understand the invention, reference is made to the accompanying drawing, in which Figs. 1 and 2 are curve diagrams showing relative behaviour of three kinds of active carbon of equal adsorption capacity, towards hydrogen peroxide. In Fig. 1 the abscissa are plotted as seconds and the ordinates as degrees centigrade. In Fig. 2 the abscissa are plotted in hours and the ordinates in volts. The curve A in Fig. 1 represents the behaviour of a carbon that is specially suitable for galvanic cells, whilst curve B relates to an active carbon that is still suitable for that purpose. The carbon of curve C is unsuitable as a depolariser for galvanic cells.

Curve A, which represents a carbon particularly suitable as depolariser, reveals a considerable rise of temperature per unit of time, viz. from 20° C. to about 24° C. in the first minute, to about 27° C. in the second minute and to about 29° C. in the third minute. The temperature rise shown by the curve is in direct proportion to the rate at which the hydrogen peroxide is decomposed by the carbon, the liberation of oxygen under the same conditions amounting to 125 cc. The curve B indicates a smaller rise in temperature—in this case from 20° C. to about 21.7° C. at the end of the third minute, the amount of oxygen disengaged being 32 cc. As already stated, this carbon is just still employable as depolariser. In the case of curve C, the carbon unsuitable for the purpose in view shows a temperature rise of less than 1° C. at the end of the third minute, and the amount of oxygen liberated during that period is 12 cc.

The curves in Fig. 2 graphically reproduce the behaviour of the carbons—the reaction curves of which are represented in Fig. 1—in cells of identical construction, and illustrate their relative efficiency as regards the progressive voltage drop during continuous discharging of the cells under identical loading conditions. As is manifest, the efficiency curves of Fig. 2 are fully concordant with those of Fig. 1.

Moreover, these observations are not restricted to the behaviour of active carbons as depolarisers in atmospheric oxygen cells, but it was ascertained, in further developing the invention, that the aforesaid experiences on the differences exhibited by, otherwise equivalent, active carbons in atmospheric oxygen cells, are equally applicable in the case of other carbonaceous compositions. In this case also it was found that, when employed as depolarisers in such cells, carbonaceous compositions of otherwise equivalent character, differ in their behaviour—as in the case of active carbons—in concordance with their ascertained power of decomposing hydrogen peroxide solutions.

Accordingly, the invention also includes the use in place of or addition to active carbon, as depolarising agent for atmospheric oxygen cells, of other carbonaceous materials, especially wood charcoal and peat coke, the power of which for decomposing hydrogen peroxide solutions corresponds to the characteristic specified.

*Example*

The following represents a comparison between two peat cokes, prepared in the same manner, with regard to their power of decomposing hydrogen peroxide, and their behaviour in an atmospheric oxygen cell.

The cokes possessed the same adsorptive capacities as measured by a methylene blue solution. In both cases 9 cc. of a solution of 1.5 grm. of methylene blue in 1000 cc. of distilled water was decolorized by 0.1 grm. of the pulverized coke.

0.1 grm. of the finely powdered peat coke was suspended in 5 cc. of distilled water and treated with 10 cc. of 3% solution of hydrogen peroxide, the amount of oxygen liberated within 1 minute being then measured. The material A liberated 18 cc. of oxygen, whilst the material B effected the separation of less than 2 cc. of oxygen.

The two products differ in a similar manner as regards their behaviour when employed as electrode material in a galvanic cell with atmospheric-oxygen depolarisation. The cell equipped with the product A showed a terminal voltage of 1.42 volts and—during discharge through a constant resistance—a mean discharge voltage of 1.1 volts. On the other hand, the cell fitted with the material B gave a terminal voltage of only 1.26 volts and—under the same loading conditions as in the case of product A—a mean discharge voltage of 0.85 volt.

I claim:

1. A method of determining the utility of active carbons for use as depolarizing agents in the positive electrodes of air depolarized galvanic cells which comprises mixing the active carbon in finely divided form with aqueous solutions of hydrogen peroxide, measuring the rise in temperature of the solution to determine those active carbons which give a rise in temperature of at least 1° C. when 0.2 gram of the carbon suspended in 10 cc. of distilled water are mixed with 25 cc. of a 3% solution of hydrogen peroxide at 20° C.

2. A method of determining the utility of active carbons for use as depolarizing agents in the positive electrodes of air depolarized galvanic cells which comprises mixing the active carbon in finely divided form with aqueous solutions of hydrogen peroxide, measuring the quantity of oxygen liberated therefrom to determine those active carbons which liberate at least 25 cc. of oxygen within 3 minutes when 0.2 gram of the carbon suspended in 10 cc. of distilled water are mixed with 25 cc. of a 3% solution of hydrogen peroxide at 20° C.

WERNER WISFELD.